United States Patent

Holston et al.

Patent Number: 5,410,935
Date of Patent: May 2, 1995

[54] BAND SAW BLADE

[75] Inventors: James R. Holston, Orange, Mass.; William B. Korb, Melrose, Conn.

[73] Assignee: American Saw & Mfg. Company, East Longmeadow, Mass.

[21] Appl. No.: 144,349

[22] Filed: Nov. 1, 1993

[51] Int. Cl.$^6$ .................................... B27B 33/06
[52] U.S. Cl. ............................. 83/851; 83/835
[58] Field of Search ............. 83/851, 835, 848, 849, 83/850

[56] References Cited

U.S. PATENT DOCUMENTS

| | | | |
|---|---|---|---|
| 3,032,084 | 5/1962 | Traben | 83/851 |
| 4,557,172 | 12/1985 | Yoneda | 83/850 |
| 4,727,788 | 3/1988 | Yoshida et al. | 83/851 |
| 5,094,135 | 3/1992 | Nakahara et al. | 83/851 |

Primary Examiner—Kenneth E. Peterson
Attorney, Agent, or Firm—Chapin, Neal & Dempsey

[57] ABSTRACT

An improved saw blade includes groups of saw teeth disposed along the cutting edge of the blade. Each group of teeth includes, in relation to the cutting direction of the blade, an unset leading tooth followed by two pairs of trailing teeth alternately set in opposite lateral directions outwardly of the centerline of the blade. The first pair of trailing teeth are generally of the same height as the leading tooth and the second pair of trailing teeth are shorter and have a substantially wider set than the first pair. The pair of trailing teeth that are shorter and wider set are disposed in consecutively and interposed relation between the first pair of trailing teeth. The set distance of the first pair of trailing teeth is approximately 50% of the set distance of the second pair of trailing teeth.

6 Claims, 2 Drawing Sheets

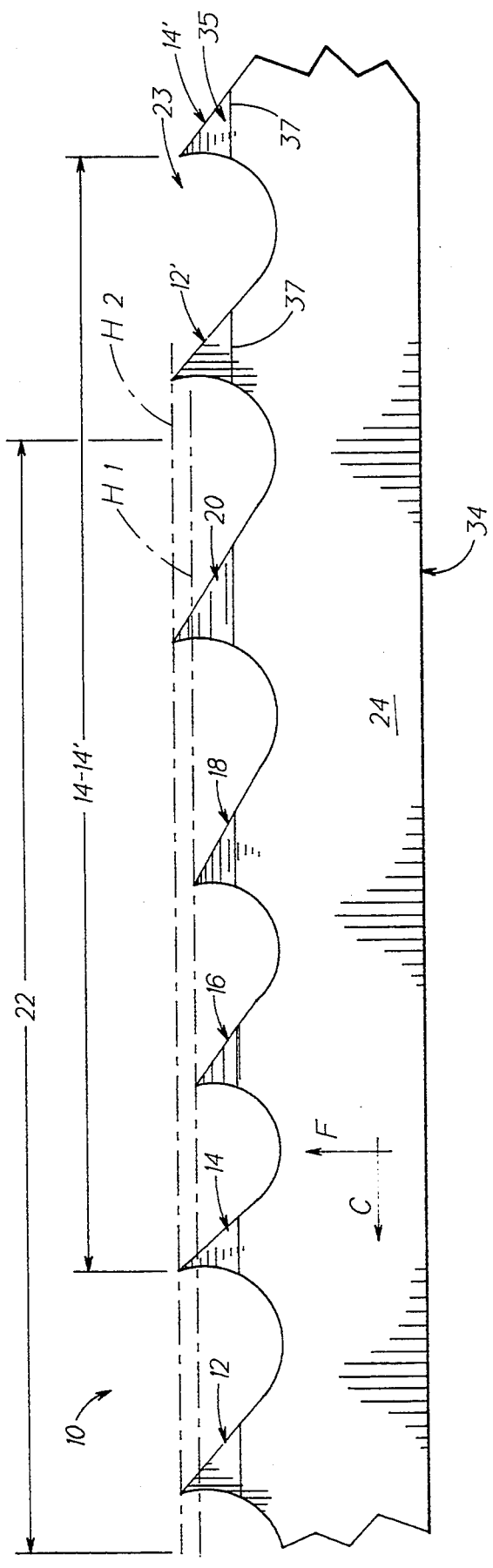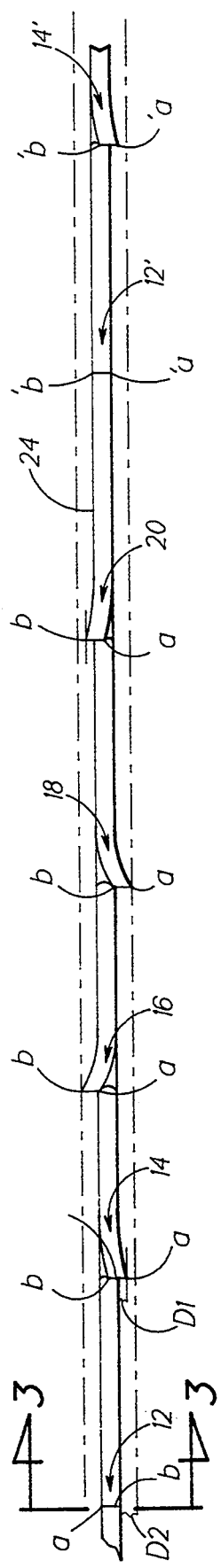
FIG. 1
FIG. 2

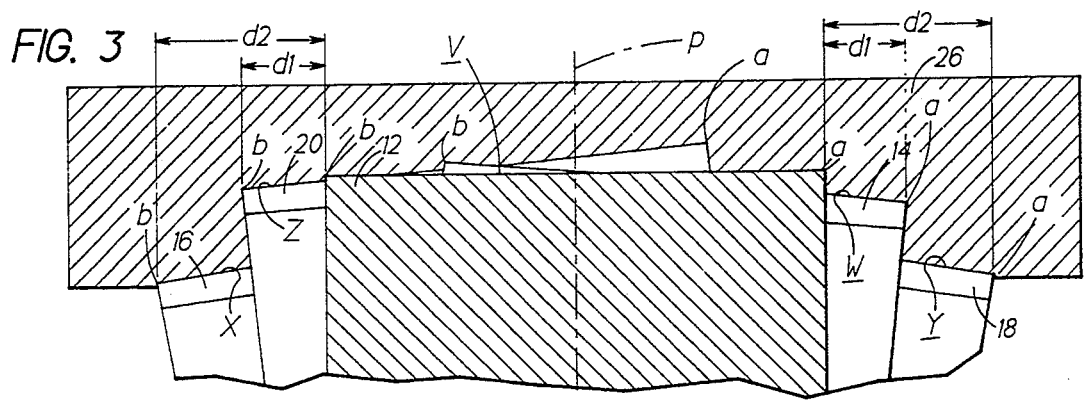
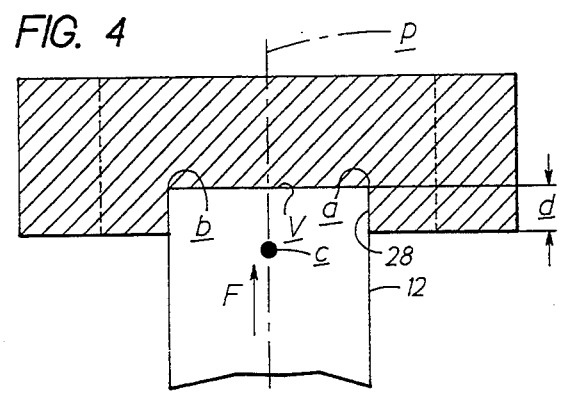
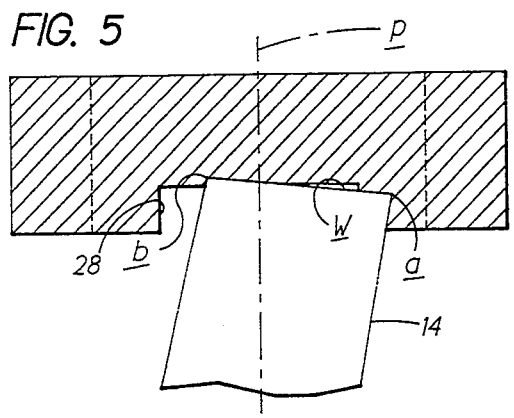
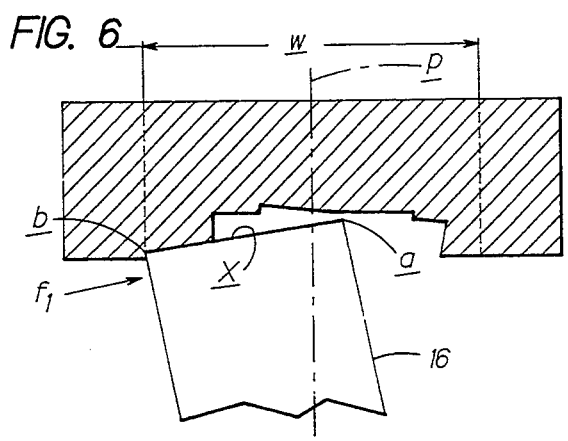
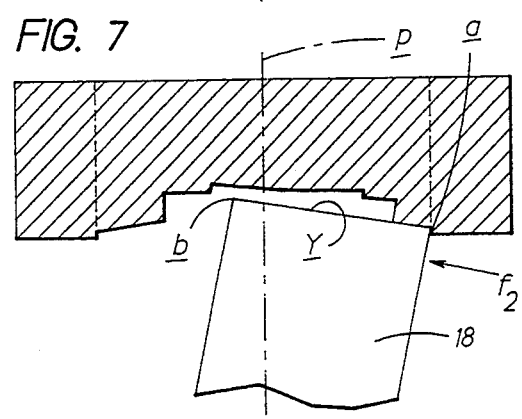
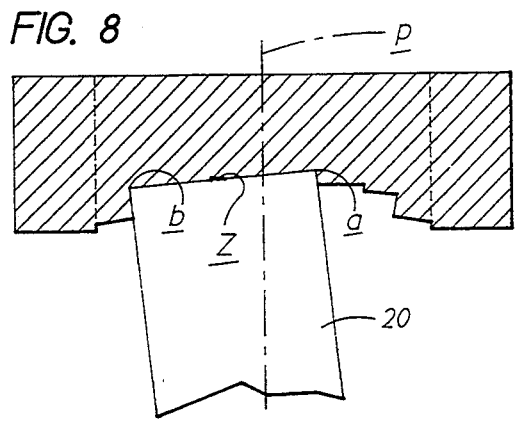

BAND SAW BLADE

FIELD OF THE INVENTION

This invention relates to an improved saw blade construction adapted for cutting difficult-to-cut materials with work hardening properties and more particularly to a novel tooth arrangement that overcomes problems encountered by similar types of blades currently being sold in the marketplace.

BACKGROUND OF THE INVENTION

In recent years, metal cutting saw blades have undergone a variety of changes and modifications in numerous attempts to solve an array of problems associated with the cutting of difficult-to-cut materials that are prone to work hardening. In the past saw blades of various types have been produced with teeth of equal height and with teeth laterally set outward on opposite sides of the sawing plane of the blade, thereby serving to widen the kerf being generated by the blade so that clearance will be provided between the body of the blade and the side walls of the kerf.

Although such laterally set teeth have been found to function in a satisfactory manner for their intended purposes, when cutting materials that are prone to work hardening, the cutting efficiency may vary significantly depending on the relative heights and the amount of set on the set teeth and how the teeth are located in relation to other teeth on the blade. For example, when cutting such difficult-to-cut materials, blades having both set and unset teeth of uniform height and in which the teeth set extend outwardly the same distance from the centerline of the blade, the results are frequently uneven tooth penetration into the work thereby causing uneven wear, work hardening and deviation from straight cutting. In addition, when the set teeth extend to different distances outwardly from the centerline of the blade, other problems result which have given rise to various problematic tooth arrangements.

The focus of such problematic arrangements has been the relative location in each group of teeth of the set teeth with respect to the unset teeth. In attempting to solve such problems, for example, it has been found that an important factor in blade performance is controlling the lateral forces acting on the blade as a result of the sequence or relative location in each group of teeth of the widest or most heavily set teeth in relation to the unset and slightly set teeth. Indeed, although those skilled in the art of band saw blades have recognized the adverse effects on the operation of such blades caused by excessive blade vibration or "noise", they have failed to propose any particular saw tooth arrangement which has provided a completely satisfactory solution for such problems. One proposed solution has been to avoid the use of equally spaced teeth which have a tendency to produce resonant frequencies and cause excessive blade wear and metal fatigue which reduces the useful life of the blade.

Further, efforts to solve such problems have resulted in many different saw blade tooth arrangements that include repeating patterns of teeth on a blade. Typically, each pattern or group includes at least one high, unset, leading tooth followed by a plurality of trailing teeth of gradually decreasing height and increasing set. For example, U.S. Pat. No. 4,557,172 to Yoneda shows a variety of embodiments form of redundant groups of teeth are arranged sequentially along the saw blade. Additionally, many of such tooth arrangements have utilized varying pitch distances between the cutting tips of adjacent teeth to decrease the detrimental effects vibrations occurring at the resonant frequency of the tooth pattern.

Such tooth patterns have often resulted in unforeseen problems, especially in the case of cutting materials, prone to work hardening, such as stainless steel. Where a pattern utilizes teeth of varying heights but with only one level of set as disclosed in '172 Patent to Yoneda some of the teeth bear the load of maximum penetration and while others have a shallow depth of penetration and load or, as mentioned in Yoneda, do not cut at all. In cutting a material prone to work hardening using a blade of the type disclosed in the Yoneda Patent, the lower set teeth have the tendency of fretting or rubbing the surface of the workpiece thereby resulting in work hardening of the already hard material and making it even harder to cut. Further, as seen in U.S. Pat. No. 4,813,324 to Yoshida, et al, some recent saw blade designs utilize unset leading teeth and set trailing teeth, wherein the amount of set is related to the relative heights of the trailing teeth. Tests, however, have shown that blades which embody the claimed invention in Yoshida, et al, suffer significant levels of blade deviation when used on difficult-to-cut materials, especially when cutting at increased feed rates. Such deviations are apparently caused by those trailing teeth that have the greatest amount of set, having cutting edges that are displaced farthest from the blade's centerline or sawing plane and have substantially greater lateral displacement than the lighter set teeth. Upon contact with the material being cut, the wider set teeth transfer a greater lateral force to the blade than do the trailing teeth that are set closer to the sawing plane. It is postulated that such lateral forces imparted to the blade by the heavier set teeth must be compensated for, or countervailed, as quickly, or as closely, as possible to the point at which the application of that lateral force occurs in order to reduce or minimize the effects of such wobble or lateral deviation of the blade with the resulting detrimental effects of such vibrations.

Generally, and as disclosed in U.S. Pat. No. 4,557,172, for example, it has been suggested in the prior art that improved blade wear can be attained by using teeth of varying height and pitch distances between adjacent teeth which help to solve the problem of excessive vibration or "noise", particularly troublesome when cutting difficult-to-cut materials. In many of the prior patents, groups of teeth comprised of teeth of varying height and set are generally arranged along the blade in redundant or repetitive patterns. U.S. Pat. Nos. 4,727,788; 4,813,324; 4,827,822; and 4,958,546 are exemplary of such prior art saw blades in which various groups of teeth of different heights and sets are arranged in repetitive patterns. In each group of teeth a specific number of set teeth are arranged in the cutting order of: a high, unset, leading tooth followed by various arrangements of set teeth of different heights and lateral sets. For example, significant problems have been found even for those blades which are disclosed and claimed in the above referenced U.S. Pat. No. 4,813,324 to Yoshida, et al, as the nineteenth embodiment, and which blades have been manufactured and sold commercially by Amada Company of Japan. In disclosing that embodiment, the '324 Patent describes a perceived advantage in a nonconsecutive arrangement in each group of teeth of the two shortest and widest trailing teeth, as depicted in FIGS. 14(a)-14(c). It is suggested in that patent, that the arrangement as described and claimed therein has an advantage over the prior art in that the higher teeth, i.e., the unset and lightly set teeth, which bear most of cutting load, are only subjected to work loads corresponding to one pitch distance since there is no more than one lower tooth immediately preceding any of the higher load bearing teeth. According to the '324 Patent, tooth patterns having two consecutive shorter teeth would be unacceptable because there would necessarily be two pitch distances preceding at least some of the higher load-bearing teeth, resulting in greater wear of such teeth. Tests have shown, however, that the claimed invention of the '324 Patent suffer significant levels of lateral deviation or "wobble" and require substantially higher levels of cutting force than in blades that are not subjected to such levels of deviation. Apparently, the lateral vibrations produced by the arrangement of two nonconsecutive teeth of wider set results in uneven work loads on the unset and slightly set teeth, which normally assist in stabilizing or guiding the tracking of the blade. The resulting lateral deviation causes uneven wear of the cutting edges of the "guiding" teeth and can eventually lead to premature blade failure.

It has been found that various types and, in particular, band saw blades currently available in the marketplace generally fail to make square cuts over their useful life particularly when cutting materials prone to work hardening and it is postulated that this deficiency is caused by the arrangement of the guiding teeth in relation to the heavy set teeth.

Accordingly, it is the general object of the present invention to provide an improved saw blade construction that overcomes the drawback of the prior art.

It is another object to provide a saw blade that includes cutting teeth disposed to achieve more uniform loads during cutting so that the teeth will wear more uniformly than in blades hereto available.

It is a further object to provide a saw blade with its teeth arranged to cut to uniform depths of penetration, to reduce wear of the teeth and produce more uniform chip size.

It is yet another object to provide a saw blade construction that provides reduced vibration and noise during cutting.

It is also an object to provide a saw blade that reduces problems of work hardening of the material being cut.

It is yet another object to provide a saw blade construction characterized by reduced deviation and out-of-square cutting of the work.

The above and other objects and advantages of this invention will become more readily apparent when the following description is read in conjunction with the accompanying drawings.

SUMMARY OF THE INVENTION

An improved saw blade construction of various types is disclosed for cutting a variety of materials. In the preferred embodiment, the invention comprises a saw blade having a plurality of teeth arranged in repetitive, consecutive groups, wherein each group includes an unset leading tooth and a plurality of trailing teeth. The trailing teeth are alternately set in opposed directions so that their cutting tips are positioned outwardly of the plane of symmetry of the blade, defined by the unset teeth, and include at least two teeth that are approximately the same height as the unset leading tooth and at least two teeth of substantially lower height than the leading tooth. The lower height teeth are substantially wider or heavier set than the other teeth, are disposed in consecutive order and interposed between the higher of the trailing teeth. The cutting tips of each tooth in each redundant group define a distinct cutting plane and the pitch distance between the cutting tips of any two teeth of adjacent groups of teeth which are coplanar, is the same whether or not the pitch distance between consecutive teeth in each group is the same or variable. This arrangement ensures uniform depth of penetration of each tooth at any given band speed and feed rate.

BRIEF DESCRIPTION OF THE DRAWINGS

FIG. 1 is a side elevational view of a saw blade constructed in accordance with the present invention.

FIG. 2 is a top plan view of the saw blade of FIG. 1.

FIG. 3 is a cross-sectional view, on a greatly enlarged scale, of the FIG. 1 saw blade, taken along the lines 3—3 in FIG. 2, showing a blade cutting within a kerf of a workpiece.

FIGS. 4 through 8 are schematic sequential views, on a large scale, illustrating a cutting action of each tooth of the five-tooth group pattern in accordance with the present invention.

DETAILED DESCRIPTION OF THE PREFERRED EMBODIMENTS

Referring to the drawings in detail, the preferred embodiment of a saw blade of the present invention is shown and generally designated by the reference numeral 10. The saw blade 10 comprises a plurality of teeth 12, 14, 16, 18 and 20 arranged in a group designated as 22 in FIGS. 1 and 2. The teeth 12 through 20 are arranged in sequence along the cutting edge 33 of the blade and the first two teeth of the next group of identical teeth are also shown at 12' and 14' of FIGS. 1 and 2. The blade may preferably be of a bimetallic construction comprising a flexible carbon steel backing band 24 and a high speed steel strip 35 which may be joined thereto as at 37 by electron beam welding and the teeth formed along that edge, as is well known to those skilled in the art. Each group 22 comprises a leading tooth 12 and a plurality of trailing teeth 14–20 positioned so that the trailing teeth follow the leading tooth 12 into cutting engagement with a material 26 being cut (FIG. 3), as the saw blade 10 moves in a cutting direction designated by an arrow marked C and a feeding direction designated by an arrow marked F as depicted in FIG. 1.

As best shown in FIGS. 1 and 2, the unset leading tooth 12 is in parallel alignment with a sawing plane that may be defined as, or corresponds with, the plane of symmetry p of the unset tooth 12 which, as shown in FIG. 3, is parallel to the planar side surfaces 25 and 27 of the backing blade 24. The trailing teeth 14–20 are alternately displaced, or set, away outwardly of the sawing plane 12 so that the trailing tooth 14 adjacent the unset leading tooth 12 is set to the right of the sawing plane, as viewed from the workpiece 26 or in the direction of the cross-sectional line designated at 3—3 in FIG. 2. The next trailing tooth 16 is set to the left or opposite side of the plane p, while trailing tooth 18 is set to the right, and the last trailing tooth 20 is set to the left. As seen in FIG. 1, the first and last of the trailing teeth 14 and 20 are approximately the same height H-1 above the back edge 34 of band 24 of the saw blade as the unset leading tooth 12. Trailing teeth 16 and 18 are both of a substantially lower height than the other teeth of the group corresponding to line H-2 of FIG. 1. It will be noted that tooth 14 has a right set and tooth 20 has a left set, are of the same height and the same amount of set from the plane p and accordingly both teeth perform generally the same functions and can be considered one set or pair of higher, lightly set teeth. By the same criteria, the shorter and wider set teeth 16 and 18, as will best be seen by reference to FIGS. 2 and 3, will be considered another set or pair of wider or heavier set lower teeth, each of which perform generally the same functions.

As best shown in FIGS. 1 and 2, the one set or pair of trailing teeth 14 and 20 are disposed in each group as the first and last of the trailing teeth, whereas the other pair of teeth 16 and 18 are consecutively the second and third teeth of the group. In other words, one pair of trailing teeth 14 and 20 bracket the other pair of teeth 16 and 18 whereby, in accordance with this invention, the lower and wider set teeth are consecutively disposed in interposed relation between the higher and lighter set teeth 14 and 20. This novel arrangement of the shorter and wider set teeth not only overcomes the problems addressed by the Yoshida '324 Patent, but has proven superior in performance to the conventional tooth arrangement of the prior art, i.e., high, high, low, low and to the Yoshida blade in which the trailing teeth are arranged low, high, high, low. It is postulated that the tooth arrangement of this invention is superior to both of the prior art arrangements because the two wider set teeth are adjacent to each other and are preceded and followed by at least one longer and lighter set tooth. The lateral recoil force at $f_1$ (FIG. 6) resulting from the tooth 16 cutting into the material 26 will immediately be counteracted by approximately an equal and generally opposite force $f_2$ (FIG. 7) on tooth 18. It will be recognized that those forces are primarily caused by the heavier set teeth impacting the work and thus creating an equal and opposite force in the tip of the tooth which results in a torque being applied to the body 24 of the blade. Moreover, as shown in FIGS. 1 and 2, following the second heavier set tooth 18, are three consecutive guiding or stabilizing teeth, i.e., tooth 20 and in the next group teeth 12' and 14'. In that connection, moreover, it will be noted in FIGS. 5 and 8 that the lighter set teeth 14 and 20 each engage the work at their opposite corners a and b thereby having less tendency to transmit an uneven torque to the blade as is the case with the shorter teeth 16 and 18.

In the preferred embodiment of the present invention, the distance (D-1) in FIGS. 2 and 3 of the lateral set of trailing teeth 14 and 20 of greater height is approximately 50% or in the range of 40% and 60% of the distance of the lateral set (D-2) of the consecutively disposed lower and wider trailing teeth 16 and 18. As will best be seen in FIGS. 3–8, the cutting tip of each tooth defines a separate cutting plane or, in other words, the five tooth in each group defines five separate planes, as at v, w, x, y and z in FIG. 3. An important feature of this invention is that the pitch distance between corresponding teeth, or teeth having coplanar cutting edges, are the same from the group to the next adjacent group along the saw blade notwithstanding the fact that the pitch distance or spacing between any two adjacent cutting tips in each group may be the same or vary to the same extent in each group of the blade. Thus, in the saw blades 10 of the present invention, all the teeth are positioned so that the pitch distance between any one particular cutting tip in group 22 and a corresponding tooth in an adjacent group, will be identically replicated for each successive groups of teeth along the length of the blade. This construction ensures that for saw blades of this invention when operated at a given band speed and feed rate, that there will be more uniform depth of penetration by each tooth of the blade with resulting longer blade wear.

The sequential cutting effect of the group of the five teeth illustration of the present invention is best shown in FIGS. 4–8. The first unset leading tooth 12 cuts the material 26 forming a rectangular cut or profile essentially as shown by the kerf 28 in FIGS. 4 and 5. The next high right set tooth 14 modifies the profile, as illustrated in FIG. 5, and it will be noted that both the right and left-hand corners a and b of the tooth 14, respectively, engage the workpiece. Next, the heavier set tooth 16, set to the left of the plane of symmetry p, will engage the workpiece at its left-hand corner b whereas its right-hand corner does not engage the workpiece. The opposite effect is illustrated in FIG. 7 in which the next lower and heavier set tooth 18 will engage the work only at its right-hand corner a. From a comparison of these two figures, it will be noted that the rebound or torque effect on the blade $f_1$ and $f_2$ of these two teeth will tend to be approximately equal forces in generally opposite directions, albeit longitudinally spaced apart by one pitch distance. It is postulated that the closely spaced application of these countervailing forces on the blade provide improved performance over blades of the prior art particularly where each of these lower and heavier set teeth are each preceded and followed by a plurality of consecutively arranged guiding or stabilizing teeth. As shown in FIGS. 1 and 2, following tooth 18, there is lightly set, higher tooth 20, unset tooth 12' of the next group and lightly set tooth 14'. It will be noted again, for example, with respect to FIG. 8, both the right and left-hand corners of the tooth are engaged with the work as described above in regard to tooth 14.

The underlying causes of uneven tooth wear are blade vibrations and nonuniform depth of penetration. Such vibrations result in inconsistent or uneven work loads on the teeth and cause out-of-square cutting with substantial reduction in the wear life of the blade. Lateral vibrations are produced when set teeth impact the material being cut 26. The greater the distance from a contact point between the set tooth and the sawing plane p of the blade 10, the greater will be the lateral force or torque applied to the blade which results in blade recoil and consequent vibration. Accordingly, the shorter and heavier set teeth 16 and 18 have the greatest potential for producing damaging vibrations, because as pointed out above, their cutting tips a and b are spaced outwardly a greater distance from the cutting plane of the blade than the other teeth.

Uneven wear as a result of nonuniform depth of penetration arises when similarly disposed teeth sustain varying loads. The depth of penetration, or amount of material the cutting tips 12–20 of each tooth in group 22 depends on the feed rate and speed of the blade relative to the work, shown as direction F in FIG. 1. Various types of saw blades that are utilized for cutting difficult-to-cut materials, such as an embodiment of the saw blade of the present invention, typically operate at constant speed and feed rates. Therefore, the depth of penetration of a tooth in group 22 is directly proportional to the pitch or distance between that tooth and a tooth in a corresponding cutting plane in a preceding group of teeth on the blade.

Compared to saw blades of conventional design in the five-tooth redundant groups as utilized in the present invention, the depth of penetration for each of the cutting tips will be the same when the feed rate and saw blade speed are constant. The result is more evenly distributed loads on the teeth which extends the useful life of the blade. Additionally, because the depth of penetration and the kerf width cut by the cutting tips of each tooth are uniform, the size of the chips or cuttings made thereby are generally of the same size as the blade cuts through the work. This feature provides another advantage because of the uniform chip size, there will be less blade wear caused by binding between the blade and the kerf wall and therefore less damage to the cutting teeth.

Actual cutting tests have been conducted that establish remarkably improved performance of various types of saw blades embodying this invention over types of commercially available saw blades. Indeed, except for differences in their tooth geometry, all the band saw blades tested are virtually identical being 1.360"×0.042", ¾ variable pitch blades of bimetallic construction having alloy steel backing bands with cutting edges of M-42 high speed steel. In the test results listed below, the blades constructed in accordance with the present invention are referred to as "Group 4" and the two other types of blades tested were commercially available saw blade constructions referred to as "Group 1" and "Group 8" in the test data recorded in chart form as follows:

| TRIAL NO. | CONDITIONS | TOOL-LIFE (CUTS) | | |
|---|---|---|---|---|
| | | Group 1 | Group 4 | Group 8 |
| 1 | Cutting 304 stainless, 4" round bars on HEM 1200A, average 3 blades each group | 563 | 1128 | 1001 |
| 2 | Cutting 304 stainless, 4" round bars on Daito GA-400, average 2 blades each group | 1346 | 2449 | 2099 |
| 3 | Cutting 3340 steel, 4" round bars on Amada HFA-16S 1 blade each group | 1474 | 2032 | 851 |

| TRIAL NO. 4 | | | | | | |
|---|---|---|---|---|---|---|
| | Resultant Cutting Force (lbs) | | | Squareness of Cut Amount Out of Square (inches) | | |
| Feed Rate in/min. | Group 1 | Group 4 | Group 8 | Group 1 | Group 4 | Group 8 |
| 0.14 | 58.2 | 43.4 | 49.6 | 0.013 | 0.007 | 0.015 |
| 0.72 | 149.4 | 141.7 | 140.0 | 0.011 | 0.011 | 0.010 |
| 1.44 | 252.6 | 207.5 | 231.7 | 0.008 | 0.011 | 0.012 |
| 2.16 | 356.1 | 323.5 | 418.9 | 0.017 | 0.013 | 0.032 |
| 2.88 | 744.9 | 581.6 | 820.4 | Failed | 0.073 | Failed |

In the above Charts, "Group 1" refers to a conventional saw blade design, that comprises a repeating five-tooth group, wherein each group includes an unset leading tooth, followed by four, alternately set trailing teeth that are approximately the same height as the unset tooth and in which all of the set teeth are set to the same distance outwardly of the centerline of the blade as in the Yoneda Patent.

"Group 4" refers to a saw blade constructed in accordance with the present invention.

"Group 8" refers to a saw blade constructed in accordance with the claimed invention of the aforesaid Yoshida '324 Patent, that comprises a repeating groups of teeth, wherein each group includes an unset leading tooth; a first plurality of trailing teeth that are approximately the same height as the unset tooth and alternately opposite lateral directions outwardly of the centerline of the saw blade, a second plurality of trailing teeth that are lower in height than the unset tooth, are set alternately wider than the first plurality of trailing teeth and are not positioned consecutively on the saw blade.

The workpiece cut in the trials which produced the results shown in the above charts was 4" diameter round bar stock of 304 stainless steel unless otherwise specified in the chart. The tests performed were "Tool Life" (Trial Nos. 1–3) and "Resultant Cutting Force" and "Squareness of Cut" (Trial No. 4). The Tool Life tests were run on automatic band saw machines of either the pressure or constant feed rate type. In the former, the blade is pressed into the workpiece by means applying a controllable pressure to the back edge of the blade and the feed rate is varied depending on the resistance to cutting being offered by the work in the feed direction while the blade is being driven at a uniform rate in the cutting direction. In the latter machine, the blade is maintained at a constant feed rate despite the resistance of the material being cut. The machine used in the Tool Life tests run in Trial No. 1 was a was HEM 1200A available from HEM, INC., Pryor, Okla. In Trial No. 2, the machine used was a DAITO GA-400, manufactured by DAITO SEIKI CO., LTD., Japan. In Trial Nos. 3 and 4, an AMADA HFA-16S available from AMADA COMPANY, LIMITED, Japan was used and the blades used in the cutting tests of Trial No. 4 were the same variable pitch blades as identified above. In each test listed in the charts above, the blade was driven at a constant blade speed of 120 feet per minute. The tests of Trial No. 4 were conducted at different feed rates of the blade in the workpiece, increasing from a low of 0.14 inch/min. to a high of 2.88 inch/min. In Trial No. 4, it will be noted that "Group 4" blades embodying this invention demonstrated remarkably improved performance as compared to the other two blades commercially available at the time these tests were conducted. Furthermore, the extent of the improved performance of the blades constructed in accordance with this invention is greatest at the higher feed rates.

It should be understood by those skilled in the art that obvious structural modifications can be made without departing from the spirit of the invention. For example, saw blades constructed in accordance with the present invention may be manufactured of a variety of standard materials and may include jig saw blades, reciprocating saw blades, hand hack saw blades, hole saws or circular saws, as well as band saws. Accordingly, reference should be made primarily to the accompanying claims, rather than the foregoing specification to determine the scope of the invention.

Having thus described the invention, what is claimed is:

1. A saw blade construction comprising a steel band having generally planar opposite side surfaces, a cutting edge for cutting a workpiece when the blade is moved in a cutting direction thereto and a backing edge, the cutting edge being defined by saw teeth formed along said band, the improvement comprising said teeth being formed in redundant groups along said cutting edge of the blade, each of said groups comprising at least one unset leading tooth having a predetermined height and a plurality of other teeth trailing said unset tooth, in said cutting direction, said plurality consisting of two sets of trailing teeth each set consisting of two teeth, with one set thereof being generally the same height, in an unset condition, as the unset tooth and being set alternately outward of said opposite side surfaces of the band, the other set of trailing teeth being substantially lower in height than the unset tooth, said one set of teeth having a lateral set extending a given distance outwardly of said opposite side surfaces of said band, each of the teeth of said other set having a wider set than that of the one set so that the shorter of the trailing teeth extend outwardly of said opposite side surfaces a distance greater than said given distance and the shorter teeth of wider set being disposed consecutively in interposed relation between the teeth of said one set.

2. The saw blade of claim 1, wherein the distance from the side surfaces of the lateral set of the one pair of trailing teeth is on the order of 40%–60% of the distance from the side surfaces of the wider set of the other pair of trailing teeth.

3. The saw blade of claim 2, in which the distance from the side surface of the lateral set of the one pair of trailing teeth is approximately 50% of the distance from the side surfaces of the wider set of the other pair of trailing teeth.

4. The saw blade of claim 3, in which each group of teeth comprises five teeth and wherein each of said five teeth has a cutting edge disposed in a predetermined plane different from each plane of the cutting edges of the other of said five teeth and wherein the pitch distance is the same between the cutting edges of each corresponding pair of teeth which are coplanar in any two adjacent groups of teeth disposed along the length of the saw blade.

5. The saw blade of claim 4, in which the pitch distances between at least some of the adjacent pairs of teeth in each group are unequal.

6. The saw blade of claim 4, in which the pitch distances between at least some of the teeth in any one group are equal to each other.

* * * * *